United States Patent [19]

Pila

[11] 4,372,185
[45] Feb. 8, 1983

[54] MEAT CUTTING BAND BLADE MACHINE

[76] Inventor: Karl Pila, 5605 Greenwood Ave., Cote St. Luc, Quebec, Canada

[21] Appl. No.: 237,268

[22] Filed: Feb. 23, 1981

[51] Int. Cl.³ .............................................. B23D 53/06
[52] U.S. Cl. .................................... 83/101; 83/168; 83/174; 83/707
[58] Field of Search ................ 83/168, 707, 713, 716, 83/717, 729, 730, 718, 820, 174, 101

[56] References Cited

U.S. PATENT DOCUMENTS

| | | | |
|---|---|---|---|
| 860,530 | 7/1907 | Cormay | 83/174 |
| 1,643,829 | 9/1927 | Biro | 83/320 |
| 2,059,595 | 11/1936 | McKeage | 83/820 |
| 2,305,177 | 12/1942 | Litty | 83/716 |
| 2,380,700 | 7/1945 | Lasar | 83/818 X |
| 2,463,437 | 3/1949 | Steiner | 83/818 |
| 2,492,824 | 12/1949 | Ahrndt | 83/169 |
| 2,585,957 | 2/1952 | Meeker et al. | 83/818 X |
| 2,621,693 | 12/1952 | Grills | 83/717 X |
| 2,825,369 | 3/1958 | Karp et al. | 83/818 X |
| 2,978,001 | 4/1961 | Whisler | 83/168 |
| 3,534,647 | 10/1970 | Mills | 83/820 |
| 4,312,253 | 1/1982 | Johnson | 83/168 X |

Primary Examiner—James M. Meister
Attorney, Agent, or Firm—Oblon, Fisher, Spivak, McClelland & Maier

[57] ABSTRACT

A meat cutting band machine for slice cutting soft meats. The machine comprises a base and a vertical band blade support frame secured to the base. A pair of band blade wheels are rotatably supported in a spaced apart manner on the band blade support frame. A flat band blade is drivingly supported about the wheels. A drive is provided to rotate the wheels and the blade. An opening is provided in the band blade support frame to expose a meat cutting area along a straight path of the band blade. A stationary table is secured below the meat cutting area. A horizontally displaceable meat support table is displaceable on an axis parallel to the plane of the flat band blade to displace an end portion of a piece of meat placed on a support surface thereof against a cutting edge of the band blade. The horizontally displaceable meat support table has its support surface inclined rearwardly downward with the band blade extending at substantially a right angle with respect to the support surface of the displaceable meat support table.

9 Claims, 8 Drawing Figures

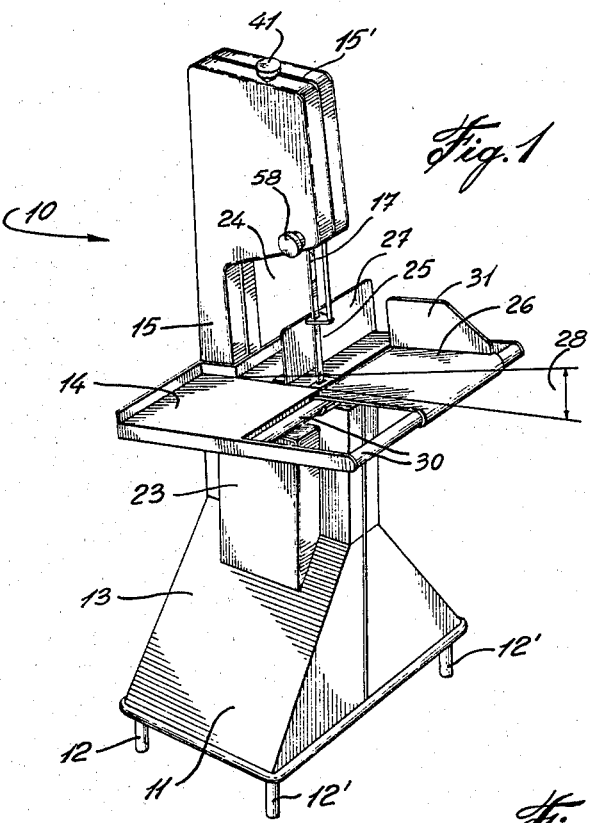
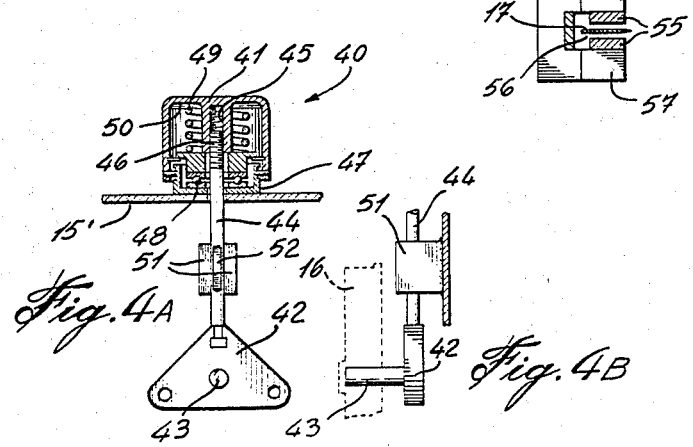

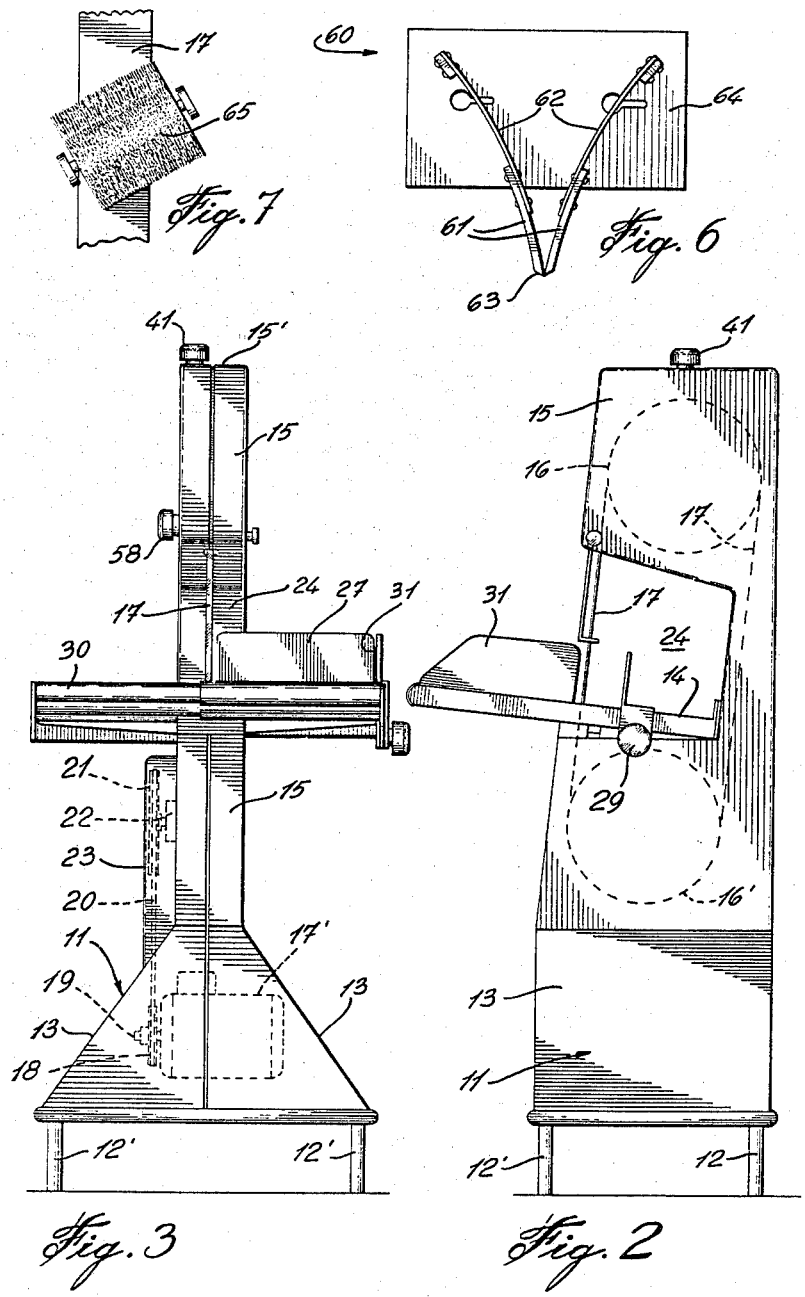

MEAT CUTTING BAND BLADE MACHINE

BACKGROUND OF THE INVENTION (a) Field of the Invention

The present invention relates to a meat cutting band blade and more particularly to a band blade for slice cutting soft meat and wherein the displaceable meat support table is inclined rearwardly downward to facilitate the cutting of slices in soft meat and the removal of such slice from a piece of meat being cut.

(b) Description of Prior Art

The usual practice employed by meat cutters for cutting soft boneless meat such as liver, steaks, etc. is to utilize a hand knife as such type of meat is difficult to manipulate on the commonly known band saws. Some of the problems encountered are that the saw blade teeth rip a channel cut in the meat resulting in a loss of meat and also the slices cut are not of uniform thickness, as the softness of the meat makes it difficult to manipulate under such saw blades as such soft meat often will stick to the meat table or the slices cut will not readily peel off from the piece of meat.

Further, the cutting of such meat by the use of hand knives is a time consuming operation and it is very difficult to obtain slices of uniform thickness from a piece of meat. Band saws are also not very sanitary when soft meat is cut thereon as the saw blade will pick up minute particles of meat in the cutting process and render it unsanitary. This is due primarily to the stickiness of such soft meat and the use of toothed band blades.

SUMMARY OF INVENTION

It is therefore a feature of the present invention to provide a machine having a meat cutting band blade for slice cutting soft meats and which substantially overcomes all of the abovementioned disadvantages of the prior art.

According to a broad aspect of the present invention, there is provided a meat cutting machine for slice cutting soft meats. The machine comprises a base and a vertical band blade support frame secured to the base. Blade support means is secured in the band blade support frame. A flat band blade is supported by the support means which is drivingly connected to a drive. An opening is provided in the band blade support frame to expose a meat cutting area along a straight path of the band blade. A stationary table is secured below the meat cutting area. A horizontally displaceable meat support table is displaceable on an axis parallel to the plane of the flat band blade to displace an end portion of a piece of meat placed on a support surface thereof against a cutting edge of the band blade. The horizontally displaceable meat support table has its support surface inclined rearwardly downward with the band blade extending at substantially a right angle with respect to the support surface of the displaceable meat support table.

BRIEF DESCRIPTION OF DRAWINGS

A preferred embodiment of the present invention will now be described with reference to the accompanying drawings in which:

FIG. 1 is a perspective view of the meat cutting machine of the present invention;

FIG. 2 is a side view of the meat cutting machine;

FIG. 3 is a front view of the meat cutting machine;

FIG. 4A is a fragmented section view of a blade tension adjusting mechanism as utilized in the machine of the present invention;

FIG. 4B is a fragmented side view of a portion of FIG. 4A;

FIG. 5 is a section view illustrating the construction of the adjustable band blade guide;

FIG. 6 is a front view of a blade scraper as utilized with the band blade; and

FIG. 7 is a plan view of a rotatable cleaning brush as used in the band blade to clean the blade.

DESCRIPTION OF PREFERRED EMBODIMENTS

Referring now to the drawings, and more particularly to FIGS. 1 to 3, there is shown generally at 10, the meat cutting machine of the present invention for slice cutting soft meats. The machine comprises a base 11 supported on legs 12 and having inwardly and upwardly tapering side walls 13 whereby the base is of substantially transverse triangular cross section to provide more working space under the stationary table 14 supported thereabove and secured to the vertical band blade support frame located in housing 15.

The band blade support frame housing 15 is a narrow elongated housing projecting centrally above the base housing 11. Both housings 11 and 15 have removable shrouds (not shown) for access to the interior thereof. The stationary table 14 extends beyond opposed side walls of the narrow elongated housing 15 which, as shown in FIG. 3, contains a pair of band blade support wheels 16 rotatably supported in a spaced apart manner in the frame, and constituting a blade support means. A flat band blade 17 is supported about both wheels 16 and the lower wheel 16' is rotatably driven by drive means, herein motor 17', located in the base 11. A drive sheave 18 is secured to the motor shaft 19 and imparts a rotation to a drive belt 20 secured between the drive sheave 18 and driven sheave 21 which is secured to the driven central shaft 22 of the lower wheel 16'. The driven sheave 21 and part of the drive belt 20 extend in a detachable housing 23 secured to one of the lower side walls of the housing 15.

An opening 24 is provided in the band blade support frame to expose a meat cutting area 25 along a straight path of the band blade 17. A horizontally displaceable meat support table 26 is secured forwardly of the cutting area and has a support surface extending in the same plane as the support surface of the stationary table 14. The displaceable support table 26 is displaceable on an axis parallel to the plane of the flat band blade to displace an end portion of a piece of meat placed on its support surface against a straight knife-like cutting edge of the band blade.

As clearly shown in FIGS. 1 and 3, both the stationary table and horizontally displaceable meat support table have their support surfaces inclined rearwardly downward with the band blade in the meat cutting area 25 extending at right angles to at least the support surface of the displaceable meat support table 26. The purpose for this inclination is to provide for the slice being cut in the soft meat to peel off from the remaining piece of meat on the displaceable table 26 as it is slid passed the blade 17 in the meat cutting area 25. Also, the inclination facilitates the placement of the end piece of meat to be cut against a thickness gauge plate 27 and is displaceably secured above the stationary table 14 and extends parallel to the plane of the blade 17 on the opposite side of the displaceable table 26.

The angle of inclination 28 of the support surface of the stationary table 14 and the displaceable table 26 is preferably at an angle of about 6° from the vertical axis. However, this precise angle is not critical and satisfactory results may be obtained with angles lying within the range of from 5° to 15°. Also, as shown in FIG. 1, the wheels 16 and 16′ secured to the band blade support frame in housing 15 have their centers rotatably secured on an axis which is also inclined rearwardly from the vertical axis on an angle which is the same as the angle of inclination of the table support surfaces whereby the blade is inclined in the area 25.

The spacing of the thickness gauge plate 27 with respect to the side wall of the blade is adjustable by means of a rotatable knob 29 preferably having a scale thereon to indicate the spacing between the plate 27 and the blade 17 and may be locked in position by means well known in the art. The displaceable plate 26 is secured on guide means, herein a pair of guide rails 30 permitting reciprocal displacement of the displaceable table therealong. The displaceable meat support table 26 is also provided with a vertical pusher plate 31 to push the end portion of a piece of meat placed on the support surface against the cutting edge of the band blade 17.

Other features of the meat cutting machine of the present invention will now be described with reference to the remaining drawings. As shown in FIGS. 4A and 4B, a blade tension adjusting mechanism 40 is provided in a top portion of the blade support frame housing 15 and is provided with an adjusting knob 41 which lies above the top wall 15′ of the housing 15. By rotating the knob 41, the tension in the band blade is adjusted. This is accomplished by having the center shaft 43 of the top wheel 16 secured to a vertically displaceable support member 42. An adjusting bolt 44 is secured to displaceable support member 42 at a lower end thereof and its upper end is threaded to a threaded bore 45 provided in an inner face of the knob 41. By rotating the knob 41, the threaded end 46 of the bolt 44 will move upwardly into the knob 41 pulling the wheel 16 upwardly and applying more tension to the band blade passing thereabout.

The knob 41 is rotatably connected to the top wall 15′ on a seating member 47 which receives a ball bearing 48 on a top face thereof which is held in place by a tension spring 49 biased thereagainst and an inner annular wall 50 of the knob. Thus, the knob is biased upwardly by the spring 49 applying an axial tension on the bolt 44. The bolt is prevented from axial rotation by means of guide plates 51 conveniently secured in the vertical frame housing 15. A stop member 52 is welded to the rod between the plates 51 to engage against a side wall of either of the plates when axial rotation is imparted to the rod 44 by rotating the knob 41.

The blade of the machine of the present invention does not have cutting teeth but a straight cutting edge whereby a knife-like cut may be made in the meat with less loss of meat as compared to conventional band blades. Also, a cutting edge may be provided on both edges of the blade. As shown in FIG. 5, an adjustable guide means is provided in the vertical housing 15 immediately above the opening 24 therein whereby to maintain the blade substantially stationary in the meat cutting area 25. The guide means consists of a pair of opposed adjustable carbide guide shoes 55 defining a flat blade receiving slot 56 therebetween guiding opposed flat side walls of the blade 17 extending therebetween to maintain the blade along a desired straight path and to prevent oscillations therein. The guide shoes 55 are mounted on displaceable support members 57 which are displaceably secured to an adjustment knob 58 to adjust their spacing.

Also, conveniently located within the upper part of housing 15 is a blade scraper 60 as shown in FIG. 6 whereby to continuously scrape the opposed faces of the blade. The scraper comprises opposed resiliently biased scraper plates 61 secured to leaf spring 62 whereby the knife-shaped scraping edges 63 are biased against each other with the blade extending therebetween. The scraper plate 61 is preferably constructed of a hard plastics material and the assembly is mounted on a securement plate 64 capable of being conveniently secured. Any foreign matter scraped from the blade will fall into the housing 15, in a convenient area or container therein, and will be removed therefrom from time-to-time by removing the removable shroud. Also, as shown in FIG. 7, a rotatable brush 65 may be secured on each side face of the blade 17 to further remove miniscule foreign matter on the blade to provide for a sanitary blade continuously passing in the meat cutting area 25. These rotatable brushes 65 would be conveniently secured along a straight path of the blade. Blade sharpening means (not shown) may be secured within the housing 15 whereby the blade would sharpen itself automatically as it passes through blade sharpeners. Preferably, the blade scraper 60 and the brushes 65 would be located downstream of the blade sharpening to remove any miniscule particles of metal that may be deposited on the blade as it passes through the sharpener. It is further within the ambit of the present invention to provide the front support legs 12′ of the base as adjustable legs whereby the angle of inclination 28 may be adjusted by simply adjusting the length of the front legs 12′ higher than the rear legs 12.

It is within the ambit of the present invention to cover any other obvious modifications thereof provided such modifications fall within the scope of the appended claims. For example, the stationary table does not necessarily have to be inclined or be at the same angle of inclination as the displaceable table.

It is also pointed out that the cutting blade may be a reciprocal straight blade supported at opposed ends to a reciprocating frame which constitutes the blade support means. Thus, it is not intended to restrict the blade and drive to an endless blade supported about two wheels rotatably driven.

I claim:

1. A meat cutting machine for slice cutting soft boneless meats, said machine comprising a base, a vertical band blade support frame secured to said base, blade support means secured in said band blade support frame, a flat band blade supported by said support means, drive means drivingly connected to said blade support means, an opening in said band blade support frame to expose a meat cutting area along a straight path of said band blade, a stationary table secured below said meat cutting area, a horizontally displaceable meat support table displaceable on an axis parallel to the plane of said flat band blade to displace an end portion of a piece of meat placed on a support surface thereof against a cutting edge of said band blade; said horizontally displaceable meat support table having its support surface inclined rearwardly downward at an angle lying within the range of from 5° to 15° with said band blade extending at substantially a right angle with respect to said support surface of said displaceable meat support table, said blade support means being a pair of band support wheels rotatably secured in a spaced apart manner by said support frame, said band blade being an endless blade having a straight cutting edge and supported about said wheels, said stationary table and said displaceable meat support table being secured to said band blade support frame and have their support surface inclined in the same plane, said wheels having their centers rotatably secured on an axis inclined rearwardly at the same angle as said surfaces, said support surfaces being disposed at right angles to said straight path of said band blade, and a thickness gauge plate displaceably secured above said stationary table and extending parallel to the plane of said blade, means to displace said gauge plate to a predetermined distance from said meat cutting area of said blade to obtain a desired slice thickness of said piece of meat placed on said displaceable meat support table.

2. A machine as claimed in claim 1 wherein said inclined axis is at an angle of about 6° from said vertical axis.

3. A machine as claimed in claim 1 wherein said stationary table has a straight front edge immediately forward of said meat cutting area of said blade, guide means secured forwardly of said front edge and extending parallel thereto, said displaceable meat support table being displaceably secured to said guide means for guided displacement thereon, said displaceable meat support table having a vertical pusher plate to push said end portion of said piece of meat against said cutting edge of said band blade.

4. A machine as claimed in claim 3 wherein a blade tension adjusting mechanism is secured to said band blade support frame, manually adjustable means to vary the tension of said band blade, one of said wheels having its rotational shaft secured to a displaceable support member connected to said adjustable means to vary the spacing between said wheels within an adjustable tension range thereby varying the tension to said blade.

5. A machine as claimed in claim 4 wherein an adjusting bolt is secured to said displaceable support member, said bolt having a threaded upper end, said manually adjustable means being a rotatable member in threaded engagement with said bolt upper end and biased against a stationary wall to apply axial pulling force on said bolt when threaded into said rotatable member when the latter is rotated in a predetermined direction.

6. A machine as claimed in claim 1 wherein adjustable guide means is secured adjacent said band blade in proximity to said meat cutting area, said guide means having a pair of opposed adjustable carbide guide shoes defining a flat blade receiving slot therebetween to frictionally engage opposed flat side walls of said blade to maintain said blade along a desired straight path through said meat cutting area thereof.

7. A machine as claimed in claim 1 wherein there is further provided a blade scraper comprising two opposed scraper plates resiliently biased against each other, each plate having a scraping edge disposed against a respective one of opposed flat faces of said blade to thereby scrape off foreign matter adhered to said faces.

8. A machine as claimed in claim 7 wherein a rotatable brush is in contact with each of said opposed faces to clean said faces of any remaining foreign matter adhered thereto.

9. A machine as claimed in claim 1 wherein blade sharpening means is secured adjacent a straight portion of said band blade to self-sharpen said straight cutting edge thereof as said blade is displaced against said sharpening means.

* * * * *